Patented May 18, 1926.

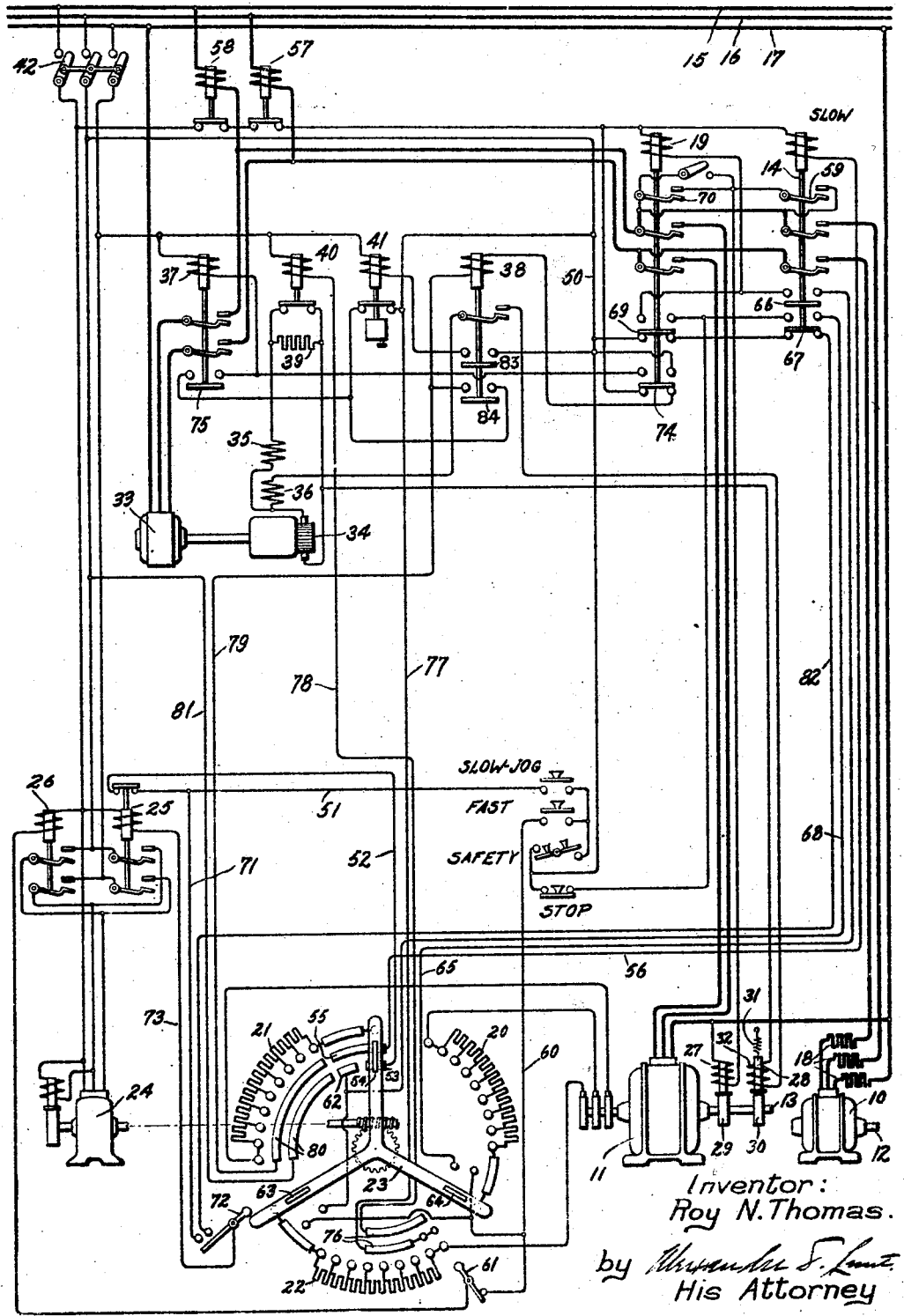

1,585,439

UNITED STATES PATENT OFFICE.

ROY N. THOMAS, OF EAST ORANGE, NEW JERSEY, ASSIGNOR TO GENERAL ELECTRIC COMPANY, A CORPORATION OF NEW YORK.

ELECTRIC BRAKING SYSTEM.

Application filed May 31, 1924. Serial No. 716,885.

My invention relates to improvements in braking systems and more particularly to braking systems for electric motor driven machines such as printing presses and the like wherein electrically operated friction brakes are applied upon the opening of the driving motor circuit.

An object of the invention is to provide an improved braking system embodying automatic means for applying electrically operated brakes with varying degrees of intensity.

A further object of the invention is to provide an electric braking system for an alternating current electric motor driven machine in which a direct current operated friction brake is applied with increasing intensity upon the disconnection of the driving motor.

In carrying my invention into effect in a preferred form, an alternating current electric motor driven machine such as for example a printing press, is provided with an electrically operated friction brake which is biased to the released position, together with a device for transforming alternating current to direct current, the device being arranged to be connected to a source of alternating current upon the energization of the alternating current driving motor of the machine and to the brake upon the de-energization of the driving motor. In order to prevent too severe an application of the brake when the press is rotating at high speed an automatic means is set into operation upon the de-energization of the driving motor to gradually increase the energization of the electrically operated brake after the application thereof.

For a better understanding of my invention, reference is had to the following description taken in connection with the accompanying drawing which diagrammatically illustrates a control system for an electric motor driven printing press embodying my improved braking system for the purpose of explaining the principles thereof.

Referring to the drawing, it will be seen that a small starting motor 10 of the alternating current squirrel cage induction type and a large variable speed running motor 11 of the alternating current phase wound rotor induction type are provided for operating the printing press (not shown). It will be understood that the armature shafts 12 and 13 of the respective motors are connected through suitable mechanical gearing (not shown) to drive the press, the gearing connecting the shaft 12 preferably being of the speed reducing type in order to permit the small motor 10 to start and jog the press at a low speed.

An electromagnetic line switch 14 is provided for connecting the small motor 10 to the alternating current supply line 15, 16 and 17 with the current limiting resistances 18 in circuit therewith and an electromagnetic line switch 19 is arranged to open and close the energizing circuit of the running motor 11.

Provision is made for operating the running motor 11 at a plurality of speeds by connecting the rotor windings thereof in circuit with the speed regulating resistances 20, 21 and 22 which are arranged to be simultaneously varied by a speed controller 23. As shown the speed controller 23 is operated by the reversible pilot motor 24 which may be connected through one of the reversing switches 25 and 26 to the supply lines 15, 16 and 17 for operation in either direction, responsively to operation of one of the normally open manual push buttons indicated in the drawing as "Slow-jog" and "Fast". The "Slow jog" and the "Fast" push buttons also cooperate with auxiliary switch mechanism controlled by the speed controller 23 to effect the energization of the starting and driving motor line switches 14 and 19 as will more fully appear in connection with the description of the operation of my invention.

For braking the press driven by the motors 10 and 11, the electrically operated friction brakes 27 and 28 are arranged to engage respectively with the cooperating braking drums 29 and 30. Although the brake drums 29 and 30 are shown as mounted upon the armature shaft 13 of the running motor 11, it will be understood that the braking drums may be mounted on a rotating part of the press if desired. As shown the friction brake 27 is of the type which is biased to the braking position and is operated therefrom upon connection of the operating winding with which the brake is provided to the alternating current supply lines 15 and 17. It will be observed however that the electrically operated brake 28 is biased from the braking position by means of a biasing spring 31 or other suitable biasing means, and is operated to the braking position responsively to energization of the operating winding 32.

In order to effect a smooth and steady application of the brake 28 at all times as well as to permit application thereof with varying degrees of intensity, I provide a variable voltage source of direct current for energizing the winding 32. In the preferred form shown, the motor generator set composed of the alternating current motor 33 and the variable voltage direct current generator 34 having a shunt field winding 35 and a commutating field winding 36 comprise a device for transforming alternating current from the supply lines 15, 16 and 17 to direct current suitable for operating the brake 28. The connection of the driving motor 33 to the supply lines 15, 16 and 17 is controlled by the electromagnetic switch 37 and the electromagnetic switch 38 controls the connection of the generator 34 to operating winding 32 of the brake 28 and as will subsequently appear, the arrangement is such that the motor generator is placed in standby service upon the operation of the press by the running motor 11 and is maintained in service until after the press is brought to a standstill under the combined braking effect of the brakes 27 and 28. A regulating resistance 39 connected in the shunt field circuit of generator 34 is controlled by the normally closed electromagnetic switch 40 to vary the voltage of generator 34.

A normally closed time element relay 41 is provided with suitable retarding means such as the adjustable dashpot shown, or may be of the well known wattmeter type. The purpose of this device as well as that of the auxiliary switch mechanism with which the electromagnetic line switches 14 and 19, the reversing switch 25 and the speed controller 23 are respectively provided as well as the push buttons indicated as "Safety" and "Stop" in the drawing will be better understood from the following description of the operation of my invention.

With the supply lines 15, 16 and 17 connected to a suitable source of alternating current and with the disconnecting switch 42 in the closed position, the small motor 10 may be individually energized to start and operate the printing press at slow speed by manual operation of the "Slow-jog" push button from the open position in which it is shown to the closed position. This establishes an energizing circuit for the operating winding of the electromagnetic line switch 14 which may be traced as follows: from the supply line 16 through the middle pole of the control disconnecting switch 42, the conductor 50, the "Safety" push button switch in the closed position, the "Slow-jog" push button switch, conductor 51, the auxiliary contact on the reversing switch 25, conductor 52, and the segment 53 the contact 54, and the segment 55 of the speed controller 23, the conductor 56 and then through the operating winding of electromagnetic switch 14 and the contact of the overload relays 57 and 58 and the left hand blade of disconnecting switch 42 to the supply line 15. The electromagnetic line switch 14 at once responds and connects the motor 10 with the current limiting resistances 18 in circuit to the supply lines 15, 16 and 17, for jogging operation of the press. The closing of line switch 14 also establishes an energizing circuit for the operating winding of the electromechanical brake 27 since one terminal of the winding is connected directly to the supply line 17 and the other terminal is connected through the blade 59 of the line switch 14 to the supply line 15. Upon the release of brake 27 the press is gradually started and accelerated to a low jogging speed. The jogging operation of the press however is continued only as long as the "Slow-jog" push button is maintained in the closed position. When released the "Slow-jog" push button returns to the open position according to its bias and interrupts the energizing circuit of the operating winding of line switch 14 thus disconnecting both the motor 10 and the operating winding of brake 27 from the supply lines 15, 16 and 17 and the braking effect of the latter soon stops the press.

If now it is desired to start and accelerate the press to one of the several running speeds, the normally open "Fast" push button is closed to energize the operating winding of the pilot motor reversing switch 26 through a circuit extending from the supply line 16 through the middle blade of the disconnecting switch 42, the conductor 50, the "Safety" switch in the closed position, the "Fast" push button, conductor 60, limit switch 61, the operating winding of switch 26, and through the left hand blade of disconnecting switch 42 to supply line 15. The resulting closure of reversing switch 26 connects the pilot motor 24 to the supply lines 15, 16 and 17 for operation in the direction required to rotate the speed controller 23 in a counterclockwise direction. When the speed controller 23 has rotated sufficiently to bring the sliding contact 54 into engagement with the segment 62, the operating winding of the electromagnetic line switch 14 is energized through a circuit extending from the conductor 60 through the auxiliary contact mechanism 63, segment 62 sliding contact 54, segment 55, conductor 56 and thence through the operating winding of electromagnetic line switch 14 to the supply line 15.

Line switch 14 at once closes and connects the starting motor 10 to the supply lines 15, 16 and 17 with the current limiting resistances 18 in circuit therewith and the motor 10 starts the press and accelerates the same to a low speed.

It will be observed that a holding circuit for the operating winding of the elctromagnetic line switch 14 is established upon the closure thereof through the "Stop" button, the auxiliary contact 67 in its upper position, the conductor 68, the segment 62, contact 54, segment 55 of the controller 23, and then through the conductor 56 and the operating winding of switch 14. Thus the "Fast" push button may be released and the motor 10 will continue operation of the press at a slow speed which is suitable for threading the press during the make-ready period.

To start the driving motor 11 and accelerate the press to one of the operating speeds, the "Fast" push button is again closed to reconnect the pilot motor 24 to the supply lines 15, 16 and 17 through the reversing switch 26 and continue the rotation of the speed controller 23 in a counterclockwise direction. While the sliding contact 54 is still in engagement with the segment 62, the auxiliary contact mechanisms 63 and 64 are simultaneously closed. Closure of contact 64 completes an energizing circuit for the operating winding of the electromagnetic line switch 19 extending through the "Fast" push button, the conductor 60, the auxiliary contact mechanism 64, the conductor 65, the auxiliary contact 66 of line switch 14 and then through the operating winding of line switch 19, to the supply line 15. Thus the line switch 19 is energized to close and connect the motor 11 to the supply lines 15, 16 and 17 with all of the resistances 20, 21 and 22 connected in the rotor circuit of motor 11. Motor 11 at once starts and accelerates the press to its lowest running speed. It will be seen that a holding circuit for the operating winding of line switch 19 is established through the stop button and the auxiliary contact 69 in its upper position when the switch 19 is closed. Also an energizing circuit for the winding of the electro-mechanical brake 27 is completed through the upper blade 70 of the line switch 19. Closure of contact 63 completes an energizing circuit for the reversing switch 26 in shunt to the "Fast" button which may be traced as follows, from the conductor 50 through "Stop" button, auxiliary contact 67 in the upper position, conductor 68, contact 63, and the limit switch 61 to the winding of electromagnetic switch 26. Hence even though the "Fast" button is released, the pilot motor 24 will continue rotation of the speed controller 23.

When the pilot motor 24 has rotated the speed controller 23 sufficiently to disengage the contact 54 from the segment 62 and at the same time open the auxiliary contact mechanisms 63 and 64, the energizing circuit of electromagnetic switch 14 is interrupted and the small motor 10 is disconnected from the supply lines 15, 16 and 17. The press then is driven entirely by the large motor 11, at the slowest speed thereof which substantially corresponds to the jogging speed of motor 10. It will be seen that if the "Fast" button has been returned to the open position the energizing circuit of reversing switch 26 also is interrupted by the opening of contact 63 and the pilot motor 24 is stopped.

The speed of the running motor 11 may now be increased through successive steps up to the maximum value by again closing the normally opened "Fast" control button.

Reversing switch 26 is again energized and connects the pilot motor 24 to supply lines 15, 16 and 17 in the manner previously described. Thereupon pilot motor 24 continues the rotation of the speed controller 23 in a counterclockwise direction and successively reduces the value of the resistances 20, 21 and 22 in the secondary circuit of the motor 11, and finally short circuits the slip rings of the motor. To reduce the operating speed of motor 11, the "Slow-jog" push button is closed. This establishes an energizing circuit for reversing switch 25 extending from the conductor 50 through the "Safety" switch and the "Slow-jog" push button, the conductor 51, the conductor 71, limit switch 72, conductor 73 and then through the operating winding of reversing switch 25 to the supply line 15. The resulting closure of reversing switch 25 connects the pilot motor 24 to the supply lines 15, 16 and 17 for operation in the reverse direction thus operating the speed controller 23 in a clockwise direction towards the position shown.

It will be observed that when the running motor line switch 19 closes, an energizing circuit for the electromagnet switch 37 is established upon the engagement of auxiliary contacts 74 with upper set of stationary contacts cooperating therewith. This circuit may be traced from the supply line 15 through the middle blade of disconnecting switch 42, the conductor 50, contacts 74, in the upper position and through the operating winding of electromagnetic switch 37 and the right hand blade of disconnecting switch 42, to the supply line 17. Hence, immediately upon the closure of running motor line switch 19, the electromagnetic switch 37 is energized to close and connect the alternating current motor 33 of the motor generator set to the supply lines 15, 16 and 17 thus setting the direct current generator 34 into standby operation preparatory to energizing the operating winding of the electromechanical brake 28 when the electromagnetic switch 38 is closed.

Whenever the speed controller 23 is set near the maximum running speed position the contact 63 engages with the segments 76 and the electromagnetic switch 40 is energized through a circuit extending from supply line 16 through the middle blade of switch 42, conductor 50, conductor 77, segments 76 and contact 63, conductor 78 and the operating winding of switch 40 to the supply line 17. This causes the switch 40 to open the short circuit around the regulating resistance 39 in the shunt field circuit of generator 34 and thereby decrease the voltage generated by the latter. This prevents full energization of the electromechanical brake 28 when the latter is applied with the speed controller 23 near the maximum speed position, and thereby effectively eliminates the shock and strain which would be occasioned by a full application of the electromechanical brake when the press is running at high speed.

To stop the press when running at full speed, the normally closed "Stop" button is operated to the open position to interrupt the energizing circuit of line switch 19. Upon the resulting opening of line switch 19, the electromechanical brake 27 is deenergized and operates to the braking position according to its bias simultaneously with the disconnection of the motor 11 from the supply lines 15, 16 and 17. At the same time the electromagnetic switch 38 is energized through a circuit extending from supply line 15 through the left hand blade of disconnecting switch 42, the contacts of overload relays 57 and 58, the auxiliary contact 74 of line switch 19 and the lower stationary contacts cooperating therewith, the operating winding of switch 38, conductor 79, segments 80 and sliding contact 54 of the speed controller 23, conductor 81 and then through the middle blade of disconnecting switch 42 to supply line 16. Switch 38 thereupon closes and connects the operating winding 32 of the electromechanical brake 28 to the generator 34 and the brake is applied with reduced power due to the decreased voltage of generator 34 as previously explained. It will be observed that closure of switch 38 also energizes the operating winding of the relay 41 through the auxiliary contact 83 with which switch 38 is provided and the relay 41 is set into operation to open its contact after a time interval determined by the retarding dash pot with which it is provided.

Also upon the opening of line switch 19 a circuit is established through the auxiliary contact 69 and the lower stationary contact cooperating therewith together with the auxiliary contact 67 of switch 14 and the lower stationary contact cooperating therewith, conductor 82, limit switch 72, conductor 73, and the operating winding of reversing switch 25 which operatively energizes the latter from the supply lines 15 and 16. The resulting closure of reversing switch 25 connects the pilot motor 24 to the supply lines 15, 16 and 17 for operation of the speed controller 23 away from the maximum speed position toward the position in which it is shown in the drawing.

Thus it will be seen that immediately upon the opening of line switch 19 the electromechanical brake 25 is energized at the reduced voltage of generator 34 as previously pointed out and at the same time the relay 41 is operatively energized and the pilot motor 24 is also energized in the manner just described.

After the predetermined time interval necessary for the pilot motor 24 to operate the speed controller 23 to disengage the contact 63 from the segments 76, the electro-magnetic switch 40 is de-energized and closes its contact to short circuit the field regulating resistance 39 of generator 34. This effects a gradual increase in the voltage generated by the generator 34 during the period required for the field to build up full strength and correspondingly increases the energization of the operating winding 32 of the electrically operated brake 28 to apply the latter with full power. Due to the combined braking effect of the brakes 27 and 28 the press is brought to a standstill smoothly and gradually.

During the operation just described the pilot motor 24 continues the rotation of the speed controller 23 in a clockwise direction towards the position shown in the drawing and after a predetermined time interval effects the disengagement of the sliding contact 54 from the segments 80. This opens the circuit through which the braking switch 38 was energized but the latter nevertheless is maintained energized through a shunt holding circuit including the auxiliary contact 84 of switch 38 and the contact of the time relay 41. Hence, after the predetermined time interval required for relay 41 to open its contact has elapsed, the braking switch 38 is de-energized and disconnects the operating winding 32 of the electrically operated brake 28 from the generator 34. Brake 28 thereupon returns to the release position according to its bias. The opening of the contact of time element relay 41 also interrupts the holding circuit of the electromagnetic switch 37 and the latter opens and disconnects the motor 33 of the motor generator set from the supply lines 15, 16 and 17. Thus it will be seen that the electrically operated brake 28 is released and the motor generator set is shut down a predetermined time interval after the opening of the energizing circuit for the running motor 11. When the pilot motor 24 has rotated the speed controller 23, to the extreme position in which it is shown in the drawing, the engagement of the limit switch 72 opens the energizing circuit, of the reversing switch 25 and the latter operates to disconnect the pilot motor 24 from the supply line.

Thus, each of the control elements of my improved control system are returned to their respective positions shown in the drawing preparatory to subsequent operation of the press responsive to operation of either of the normally opened control buttons, "Slow-jog" and "Fast" respectively as previously described.

In accordance with the provisions of the patent statutes, I have described the principles of my invention together with a preferred embodiment thereof but I would have it understood that the apparatus shown is only illustrative and that the invention may be carried out by other means.

What I claim as new and desire to secure by Letters Patent of the United States is:

1. In a braking system for an electric motor driven machine, the combination with switch mechanism for connecting the driving motor of said machine to a source of supply and disconnecting the same therefrom, of an electrically operated friction brake for said machine, a separate source of energizing current for said brake, switch mechanism for connecting the said brake to said separate source to apply the brake upon the disconnection of the driving motor and automatic means for increasing the energization of said brake after the application thereof.

2. In a braking system for an electric motor driven machine, the combination with switch mechanism for opening and closing an energizing circuit for the driving motor, of an electrically operated brake for said machine, a variable voltage source of energizing current for said brake, switch mechanism for connecting the said brake to said source to apply the brake upon the opening of the driving motor circuit, and automatic means for increasing the voltage of said source after the application of said brake.

3. In a braking system for an electric motor driven machine, the combination with switch mechanism for opening and closing an energizing circuit for the driving motor, of an electrically operated friction brake for said machine, a variable voltage source of energizing current for said brake, electromagnetic switch mechanism controlled by said first switch mechanism for connecting the said brake to said source to apply the same upon the opening of the driving motor circuit, and automatic means for successively increasing the voltage of said source and disconnecting the said brake therefrom after the opening of the driving motor circuit.

4. In a braking system for an electric motor driven machine, the combination with switch mechanism for opening and closing an energizing circuit for the driving motor of said machine, of a plurality of electrically operated friction brakes for said machine, one portion of which is biased to the braking position and electrically operated therefrom and another portion of which is biased from the braking position and electrically operated thereto, each portion of said brakes being arranged to be energized from a separate supply source, switch mechanism controlled by said first mentioned switch mechanism for de-energizing the said one portion of said brakes and energizing the said other portion of said brakes upon the opening of the driving motor circuit, and automatic means for de-energizing the said second portion of said brakes after the application thereof.

5. In a braking system for an alternating current motor driven machine, the combination with an electrically operated friction brake for said machine, means for energizing said brake to apply the same comprising a device for transforming alternating current to direct current, switch mechanism for connecting said brake to the said device, and automatic means for controlling said first means to increase the energization of said brake after the application thereof.

6. In a braking system for an alternating current motor driven machine, the combination with means for controlling the energization of the driving motor of said machine, of an electrically actuated friction brake for said machine, means for energizing the said brake to apply the same comprising a device for transforming alternating current to direct current, and switch mechanism controlled by said first means for connecting the said device to a source of alternating current upon the energization of the driving motor and to the said brake upon the de-energization of the driving motor.

7. In a braking system for an alternating current motor driven machine, the combination with switch mechanism for opening and closing an energizing circuit for the driving motor of said machine, of an electrically operated friction brake for said machine, means for energizing the said brake to apply the same comprising a device for transforming alternating current to direct current, switch mechanism for connecting the said device to a source of alternating current upon the energization of the driving motor of said machine and to the said brake upon the de-energization of the driving motor, and automatic means set into operation upon the de-energization of the driving motor for disconnecting the said device from the said source and from said brake.

8. In a braking system for an alternating current motor driven machine, the combination with switch mechanism for opening and closing an energizing circuit for the driving motor of said machine, of a friction brake for said machine biased to the released position, means for applying the said brake comprising a winding, a motor generator set for transforming alternating current to direct current, and switch mechanism for connecting the motor of said set to a source of alternating current upon the energization of the driving motor of said machine and for connecting the said winding to the generator of said set upon the de-energization of the driving motor of said machine, and automatic means set into operation upon the de-energization of the driving motor for increasing the voltage of said generator after a time interval and for thereafter disconnecting the motor of said set from the said source and the generator of said set from said winding.

9. In a braking system for a variable speed alternating current motor driven machine, the combination with means for controlling the energization and speed of the driving motor of said machine, of an electrically actuated friction brake for said machine, means for energizing said brake to apply the same comprising, a motor generator set for transforming alternating current to direct current, switch mechanism for connecting the motor of said set to a source of alternating current upon the energization of the driving motor of said machine and for connecting the generator of said set to the said brake upon the de-energization of the driving motor of said machine, and means dependent upon operation of the said speed controlling means of the driving motor for controlling the voltage of said generator.

10. In a braking system for a motor driven machine arranged to be operated at a definite low speed and at a higher speed, the combination of two electrically controlled friction brakes for said machine, the first of said brakes being biased to the braking position and electrically operated therefrom and the second of said brakes being biased to the released position and electrically operated to the applied position, and switch mechanism and connections controlled thereby whereby the first of said brakes is released when the machine is operated at either of said speeds and is applied to retard the machine after operation at either of said speeds and the second of said brakes is applied to retard the machine after operation at the high speed.

11. In a braking system for an electric motor driven machine, the combination with manually controlled means for operating the said machine at low speed and at high speed, of a plurality of electrically operated friction brakes for said machine, one portion of which is biased to the braking position and electrically operated therefrom and another portion of which is biased from the braking position and electrically operated thereto, electrically operated switch mechanism controlled by said means for respectively energizing and deenergizing the said one portion of said brake upon the initiation and termination of both low speed and high speed operation of said machine and for energizing said other portion of the said brakes to apply the same upon the termination of high speed operation of said machine, and automatic means for increasing the energization of said second portion of said brakes after the application thereof.

12. In a braking system for an electric motor driven machine, the combination with a driving motor for operating the said machine at slow speed, a second driving motor for operating the said machine at a plurality of running speeds, switch mechanism selectively operable to connect each of said motors to a source of supply and to control the speed of said second motor, of a plurality of electrically operated friction brakes for said machine, one portion of which is biased to the braking position and electrically operated therefrom and another portion of which is biased from the braking position and electrically operated thereto, switch mechanism controlled by said first mentioned switch mechanism for energizing and deenergizing the said one portion of said brakes simultaneously with the energization and deenergization of said motors, and electromagnetic switch mechanism controlled by said first mentioned switch mechanism for energizing the said other portion of said brake to apply the same upon the deenergization of said second motor.

13. In a braking system for a variable speed alternating current motor driven machine, the combination with means for controlling the energization and speed of the driving motor of said machine, of a plurality of electrically operated friction brakes for said machine, one portion of which is biased to the braking position and electrically operated therefrom and another portion of which is biased from the braking position and electrically operated thereto, means for energizing the said second portion of said brakes to apply the same comprising a device for transforming alternating current to direct current, switch mechanism for connecting the said device and the said first portion of said brakes to a source of alternating current upon the energization of the driving motor of said machine and for connecting the said device to the said second portion of said brakes and disconnecting the said first portion of said brakes to apply the same upon the deenergization of the driving motor of said machine, and automatic means for increasing the energization of said second portion of said brake after the application thereof.

14. In a braking system for a variable speed alternating current motor driven machine, the combination with means for controlling the energization and speed of the driving motor of said machine, of a plurality of electrically operated friction brakes for said machine, one portion of which is biased to the braking position, and electrically operated therefrom, and another portion of which is biased from the braking position and electrically operated thereto, means for energizing the said second portion of said brakes to apply the same comprising a motor generator set for transforming alternating current to direct current, switch mechanism for connecting the motor of said set and the said first portion of said brakes to a source of alternating current upon the energization of the driving motor of said machine and for disconnecting the said first portion of said brakes from said source and connecting the generator of said set to the said second portion of said brakes upon operation of the deenergization of the driving motor of said machine, means dependent upon the said speed controlling means of the driving motor for controlling the voltage of said generator, and automatic means set into operation upon the deenergization of the driving motor for successively increasing the voltage of said generator and disconnecting the motor of said set from the said source and the generator of said set from said second portion of said brakes.

In witness whereof, I have hereunto set my hand this 28th day of May, 1924.

ROY N. THOMAS.

Certificate of Correction.

It is hereby certified that in Letters Patent No. 1,585,439, granted May 18, 1926, upon the application of Roy N. Thomas, of East Orange, New Jersey, for an improvement in "Electric Braking Systems," an error appears in the printed specification requiring correction as follows: Page 7, line 35, claim 14, strike out the words "operation of" and insert the same to follow after the word "upon," line 37, in same claim; and that the said Letters Patent should be read with this correction therein that the same may conform to the record of the case in the Patent Office.

Signed and sealed this 13th day of July, A. D. 1926.

[SEAL.]

M. J. MOORE,
*Acting Commissioner of Patents.*